United States Patent [19]
Kim et al.

[11] Patent Number: 6,024,621
[45] Date of Patent: Feb. 15, 2000

[54] APPARATUS AND METHOD FOR FORMING PARTITION WALLS OF PLASMA DISPLAY DEVICE

[75] Inventors: Min-ho Kim; Wan-woo Park, both of Suwon, Rep. of Korea

[73] Assignee: Samsung Display Devices Co., Ltd., Kyungki-do, Rep. of Korea

[21] Appl. No.: 09/201,122

[22] Filed: Nov. 30, 1998

[30] Foreign Application Priority Data

Feb. 24, 1998 [KR] Rep. of Korea .................... 98-5806

[51] Int. Cl.[7] ...................................................... H01J 9/00
[52] U.S. Cl. .............................................................. 445/24
[58] Field of Search ............................... 445/24; 313/584

[56] References Cited

U.S. PATENT DOCUMENTS 5,725,406  3/1998  Togawa ..................................... 445/24
5,853,446  12/1998  Carre et al. ............................. 445/24

*Primary Examiner*—Kenneth J. Ramsey
*Attorney, Agent, or Firm*—Lowe Hauptman Gopstein Gilman & Berner

[57] ABSTRACT

A method for forming partition walls of a plasma display device comprising the steps of: (a) preparing a substrate; (b) forming a partition wall layer of a predetermined thickness on the upper surface of the substrate; and (c) forming partition walls by cutting the partition wall layer to a predetermined depth.

11 Claims, 3 Drawing Sheets

APPARATUS AND METHOD FOR FORMING PARTITION WALLS OF PLASMA DISPLAY DEVICE

BACKGROUND OF THE INVENTION

1. Field of the Invention

The present invention relates to an apparatus and method for forming partition walls of a plasma display device using wire saws.

2. Description of the Related Art

A plasma display device is a device for generating light by exiting fluorescent materials or special gases. That is, a predetermined voltage is applied across two electrodes installed in a hermetically sealed space filled with a gas to create a glow discharge, and a fluorescent layer is excited by ultraviolet radiation occurring during the glow discharge to form an image.

The plasma display device includes upper and lower substrates, partition walls formed to define a discharge space between the upper and lower substrates, at least one pair of electrodes provided in the discharge space to create a main discharge or an auxiliary discharge. The partition walls are usually formed on the upper surface of the lower substrate, and the conventional method of forming partition walls are as follows.

FIG. 1 shows a conventional method of forming partition walls, which utilizes a printing method.

As shown in FIG. 1, an electrode layer 12 of a predetermined pattern is formed on the upper surface of a substrate 11, and a dielectric layer 13 of an insulation layer is formed on the substrate 11 on which the electrode layer is formed. Further, after a screen 14 in which the same pattern as the partition wall pattern is formed is laid on the substrate 11 on which a dielectric layer 13 is formed, partition wall material 10–15 $\mu$ thick is repeatedly printed, and is dried and thermally set to form partition walls 15.

In the above-mentioned method, since the printing process and the drying and thermosetting process of the partition walls must be repeated, the deformation of the partition walls may take place. In particular, since the screen must be aligned with the substrate before every printing process, misalignment may take place. Accordingly, there is a problem in that the surface of the partition walls is not sharp. This results in decreased productivity.

FIG. 2 shows an another conventional method of forming partition walls.

Referring to FIG. 2, a partition wall layer 24 of a predetermined thickness is formed on the upper surface of the substrate 23 sequentially provided with an electrode layer 21 and a dielectric layer 22 considering the height of the partition wall to be formed. Then, an abrasion preventing mask 25 which has the same pattern as the partition wall pattern is laid on the partition wall layer 24, and sand mixed with high pressure air or water is blasted on the upper surface of the partition wall layer 24. Accordingly, the portions of the partition wall layer 24 which are not shielded by the abrasion preventing mask 25 are abraded to form discharge spaces. Here, the other portions which are not abraded due to the abrasion preventing mask 25 are partition walls 26.

In the above method of forming the partition walls, the process of forming the abrasion preventing mask 25 is complicated, and since the partition wall material is removed in a fine powder state, a pollution problem is caused. Further, a separate cleaning process is required to remove the sand adhering to the partition wall material after abrading the partition wall layer 24. Furthermore, when the above method is employed, it takes a long time to form the partition walls. When considering the present state of the art, it is hard to form partition walls of desired precision and mechanical strength by the above sand blasting method.

SUMMARY OF THE INVENTION

To solve the above problems, it is an objective of the present invention to provide a method for forming partition walls of a plasma display device, by which precise and sharp partition walls can be formed, the distribution of partition wall dimensions can be narrowed, and the productivity of the partition wall formation, and an apparatus thereof.

Accordingly, to achieve the above objective, there is provided a for forming partition walls of a plasma display device comprising the steps of: (a) preparing a substrate; (b) forming a partition wall layer of a predetermined thickness on the upper surface of the substrate; and (c) forming partition walls by cutting the partition wall layer to a predetermined depth.

Further, the step (b) includes the steps of: forming an electrode layer of a predetermined pattern on the upper surface of the substrate; forming a dielectric layer on the upper surface of the electrode layer; and forming a partition wall layer on the upper surface of the dielectric layer.

In addition, the partition wall layer is formed by coating a partition wall material in a paste state on the upper surface of the dielectric layer.

In addition, the method according to the present invention further includes a step of forming a protective layer above the positions of the electrode layer between the dielectric layer and the partition wall layer.

Preferably, the partition wall layer is cut by a plurality of wire saws.

According to another aspect of the present invention, there is provided an apparatus for forming partition walls of a plasma display device comprising: a table on which a substrate uniformly coated with a partition wall layer of a predetermined thickness is mounted; an elevating device for vertically moving the table; main rollers respectively installed at both sides of the table; guide rollers installed at the respective sides of the main rollers; at least one wire saw installed around the main rollers and the guide rollers to be parallel to the upper surface of the table; and a driving motor for traveling the wire saw by rotating at least one of the main rollers and the guide rollers, wherein the traveling wire saw cuts the partition wall layer of the substrate to a predetermined depth to form partition walls.

Guide grooves are formed to guide the wire saws around the circumferential surfaces of the main rollers and/or the guide rollers.

The distance between the wire saws corresponds to the thickness of the partition wall, and the diameter of the wire saw corresponds to the distance between the partition walls.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

FIGS. 3A through 3E show a preferred embodiment of a method of forming partition walls of a plasma display device according to the present invention.

Figure 1:
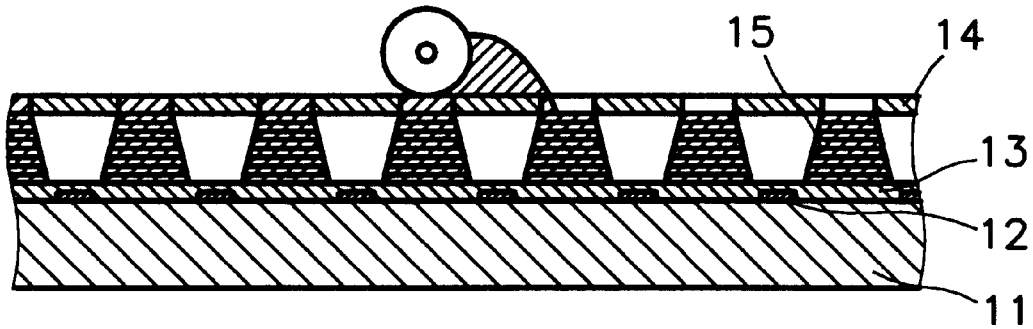
FIG. 1 is a section view illustrating a conventional method of forming partition walls.
Figure 2:
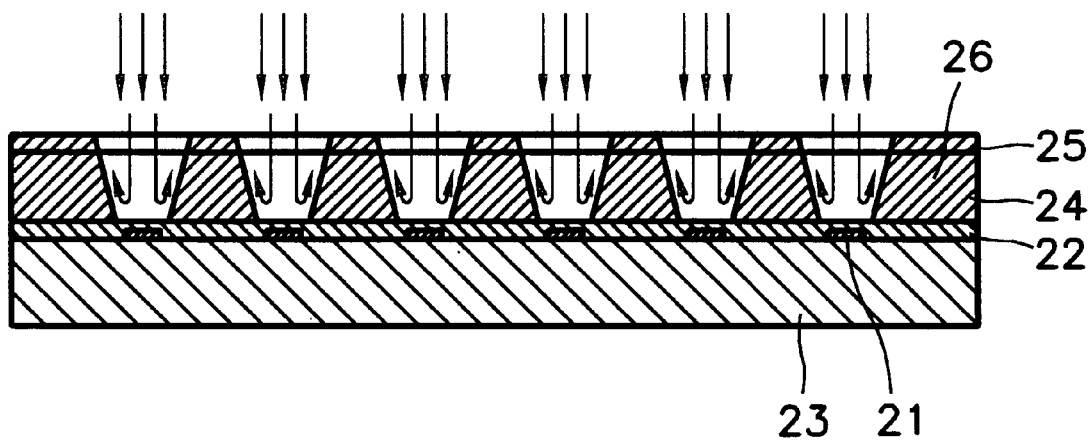
FIG. 2 is a section view illustrating another conventional method of forming partition walls.
Figure 3A:
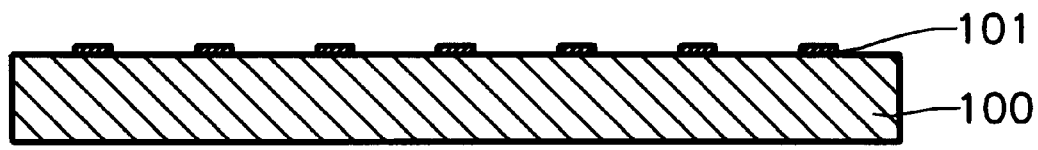
FIGS. 3A through 3E are section views sequentially illustrating a method of forming partition walls of a plasma display device according to the present invention.

As shown in FIG. 3A, an electrode layer 101 of a predetermined pattern is formed on the upper surface of a substrate 100. The electrode layer 101 is formed of strips parallel to the partition walls to be formed, and is preferably formed by a photoresist method.

Figure 3B:
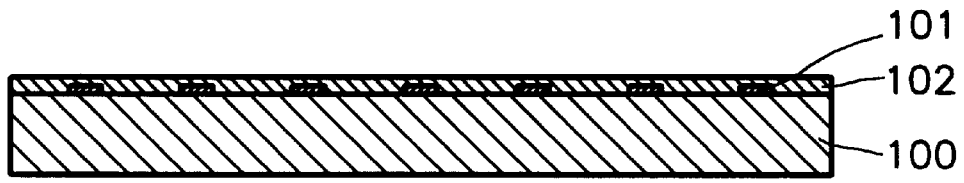

When the electrode layer 101 has been formed, a dielectric layer 102 of FIG. 3B is coated on the upper surface of the electrode layer 101.

Figure 3C:
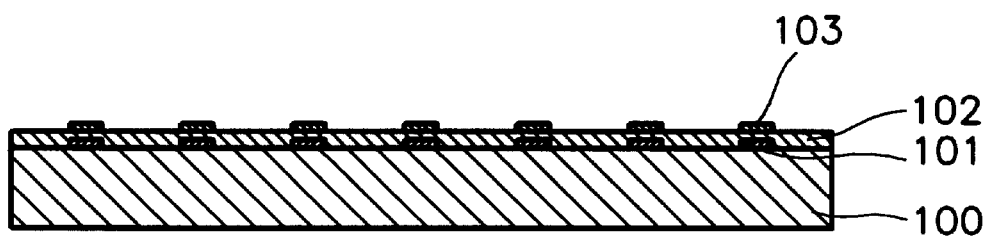

Then, referring to FIG. 3C, a protective layer 103 which has the same pattern as the pattern of the electrode layer 101 is formed on the dielectric layer 102 above the positions corresponding to the electrode layer 101. That is, a photoresist layer (not shown) is formed on the dielectric layer 102, and is exposed and developed in the same pattern as the electrode pattern to form the protective layer 103. The material of the dielectric layer 102 includes pure water as a solvent, an organic binder, and a photosensitive material. As the organic binder, a copolymer of polyvinylpyrrolidone or poly(acrylamide-co-diacetoneacrylamide) is used, and as the photosensitive material, 4-(phenylamino)-benzenediazonium polymer with formaldehyde, zinc chloride or 4,4'-diazidostilbene-2,2'-disulfonic acid disodium salt is used.

Figure 3D:
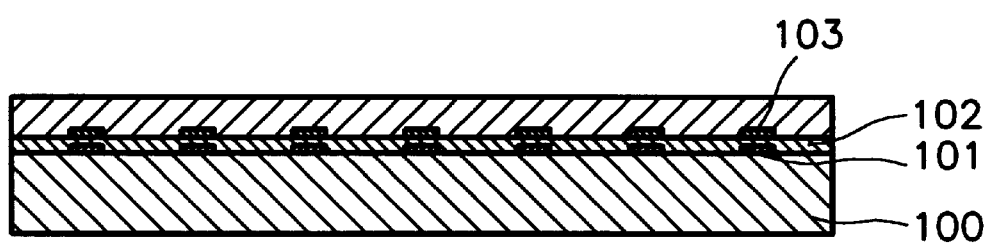

Then, as shown in FIG. 3D, a partition wall layer 104 is formed on the upper surface of the protective layer 103 to a height corresponding to that of the partition walls to be formed. Preferably, to form the partition wall layer 104, a partition wall material of a paste state is coated on the upper surface of the substrate provided with the protective layer 103 utilizing, for example, a blade coater while a uniform pressure is applied.

Figure 3E:
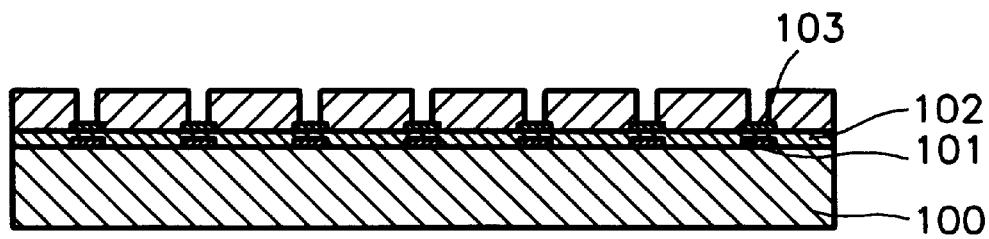

When the partition wall layer 104 has been formed, the portion of the partition wall layer 104 provided with the protective layer 103 is cut with a wire saw. At this time, the cutting of the partition wall layer 104 is performed until the protective layer 103 is exposed as shown in FIG. 3E, and consequently, partition walls 104' are formed. Finally, the protective layer 103 between the partition walls 104' is removed by etching.

Figure 4:
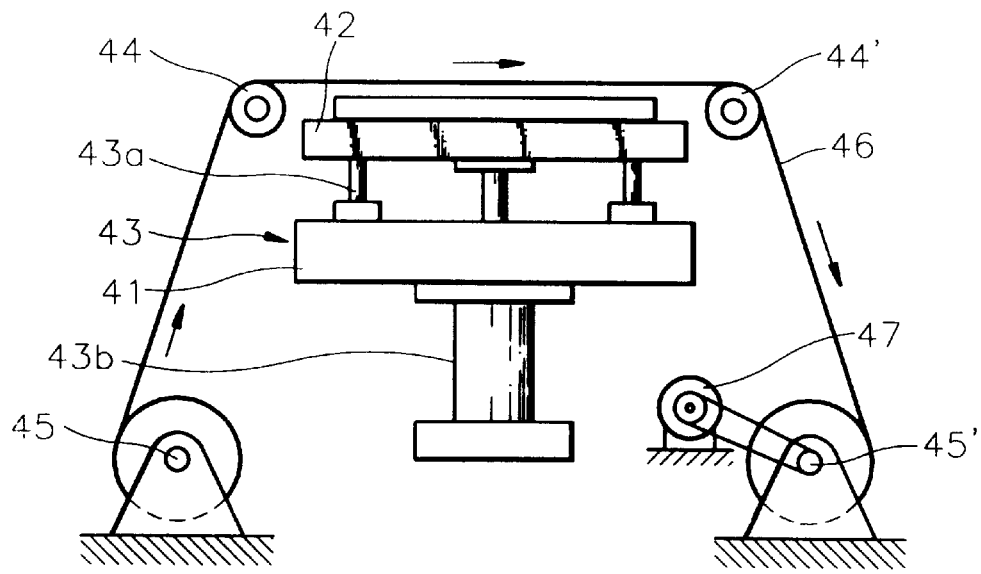
FIG. 4 is a side view illustrating an apparatus of forming partition walls of a is plasma display device according to the present invention.
Figure 5:
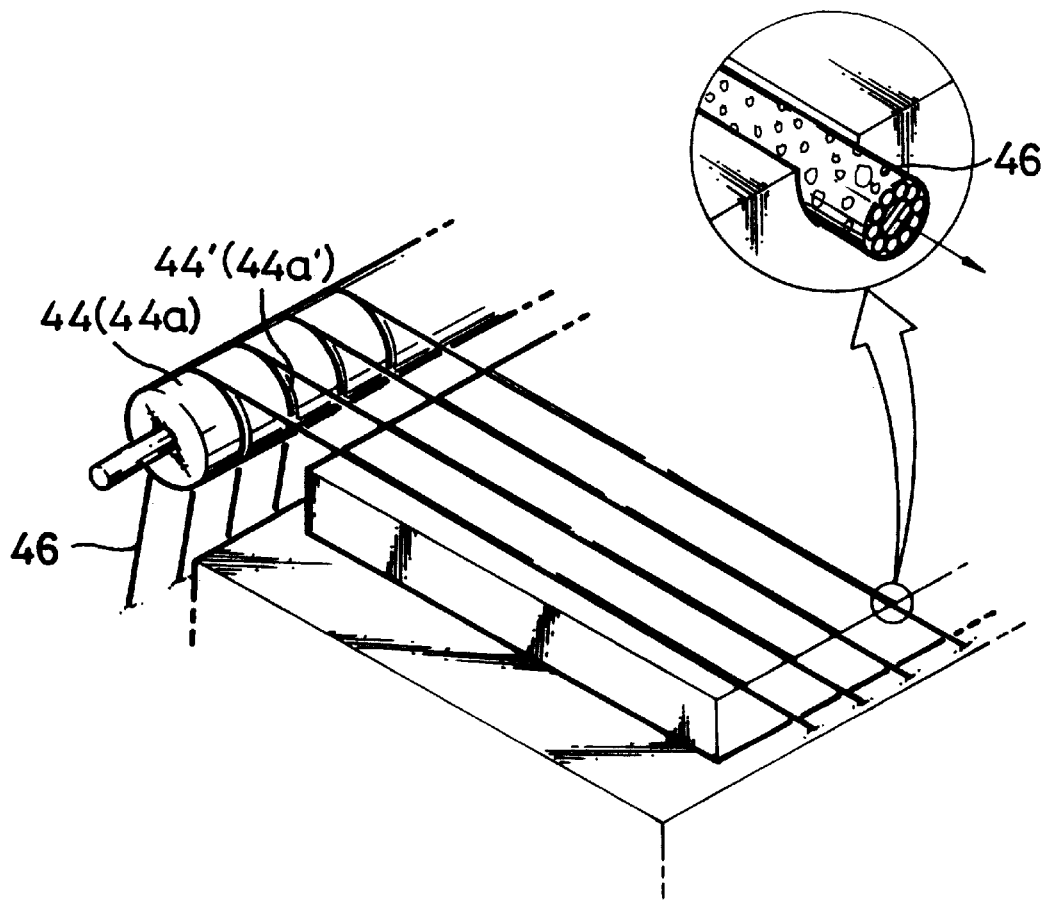
FIG. 5 is a perspective view illustrating an operating example of an apparatus of forming partition walls of a plasma display device according to the present invention.

FIGS. 4 and 5 shows an embodiment of an apparatus for forming partition walls on a substrate according to the above method.

As shown in FIGS. 4 and 5 the apparatus according to the present invention includes a table 42 installed on a frame 41, an elevating device 43 for moving the table 42 to a predetermined height, main rollers 44 and 44' installed at both sides of the table 42, and guide rollers 45 and 45' positioned below the table 42.

In addition, at least one wire saw 46 is installed around the main rollers 44 and 44' and the guide rollers 45 and 45' to be parallel to the upper surface of the table 42. The diameter of the wire saw 46 has the same dimension as the distance between the partition walls (please refer to reference numeral 104' of FIG. 3E). Further, when a plurality of wire saws are provided, the distance between the neighboring wire saws 46 corresponds to the thickness of the partition wall 104'. Guide grooves 44a and 44a' for supporting the wire saws 46 are formed around the circumferential surfaces of the main rollers 44 and 44'. Though not shown, grooves corresponding to the guide grooves 44a and 44a' of the main rollers 44 and 44' are formed around the circumferential surfaces of the guide rollers 45 and 45'.

At least one of the main rollers 44 and 44' and the guide rollers 45 and 45' is rotated by a driving motor 47.

The elevating device 43 includes guide bars 43a which are fixed to the lower surface of the table 42 and are installed to be vertically movable with respect to the frame, and an actuator 43b for vertically moving the table 42.

The actuator 43b may be a cylinder which has a movable rod fixed to the lower surface of the table 42. Alternatively, the actuator may be composed of a rotatable screw, and a block which moves vertically according to the rotation of the screw. Such an elevating device is not limited to the above embodiments.

The operation of the apparatus for forming partition walls of a plasma display device according to the present invention, which has the structure as described above, is described as follows.

As shown in FIG. 3D, the substrate 100 on which the electrode layer 101, the dielectric layer 102, the protective layer 103 and the partition wall layer 104 are sequentially formed is secured on the table 42 of FIG. 4. At this time, the substrate 100 is so aligned that the protective layer 103 can be positioned just below the wire saw 46.

In this state, the driving motor 47 is operated to rotate at least one of the main rollers 44 and 44' and the guide rollers 45 and 45'. Accordingly, the wire saws 46 supported by the main rollers 44 and 44' and the guide rollers 45 and 45' travel, and in this state, the table 42 is raised by the elevating device 43.

Therefore, as the partition wall layer 104 of the substrate 100 is cut by the wire saws 46, the partition walls 104' are formed. At this time, since the diameter of the wire saw 46 has the same dimensions as the gap between the partition walls 104' to be formed, the gaps between the neighboring partition walls can be uniformly formed. As mentioned above, cutting is performed until the protective layer 103 is exposed.

When the cutting step is completed, the table is lowered by the elevating device 43 to separate the substrate 100 from the table 42. Then the protective layer 103 is etched away, and the formation of the partition walls is completed.

With the method for forming partition walls of a plasma display device and the apparatus thereof according to the present invention, since the partition walls are easily formed by grinding the partition wall layer with the wire saws, the method and apparatus are appropriate for the mass production of a substrate. Further, since the repeatedly required alignment of a mask with a substrate as in a conventional method is not required, the manufacturing process is simple and precise and sharp partition walls can be formed.

Although an embodiment of the invention has been illustrated and described in detail for purposes of illustration, it should be understood that various modifications may be made by those skilled in the art without departing from the spirit and scope of the invention.

What is claimed is:

1. A method for forming partition walls of a plasma display device comprising the steps of:
   (a) preparing a substrate;
   (b) forming a partition wall layer of a predetermined thickness on the upper surface of the substrate; and
   (c) forming partition walls by cutting the partition wall layer to a predetermined depth.

2. The method for forming partition walls of a plasma display device as claimed in claim 1, wherein the step (b) includes the steps of:
   forming an electrode layer of a predetermined pattern on the upper surface of the substrate;
   forming a dielectric layer on the upper surface of the electrode layer; and
   forming a partition wall layer on the upper surface of the dielectric layer.

3. The method for forming partition walls of a plasma display device as claimed in claim 2, wherein the partition wall layer is formed by coating a partition wall material in a paste state on the upper surface of the dielectric layer.

4. The method for forming partition walls of a plasma display device as claimed in claim 2, further including a step of forming a protective layer above the positions of the electrode layer between the dielectric layer and the partition wall layer.

5. The method for forming partition walls of a plasma display device as claimed in claim 4, wherein the portions of the partition wall layer corresponding to the positions on which the protective layer is formed are cut until the protective layer is exposed.

6. The method for forming partition walls of a plasma display device as claimed in claim 1, wherein the partition wall layer is cut by a plurality of wire saws.

7. The method for forming partition walls of a plasma display device as claimed in claim 6, wherein the diameter of the wire saw has dimensions corresponding to the distance between the partition walls.

8. An apparatus for forming partition walls of a plasma display device comprising:
   a table on which a substrate uniformly coated with a partition wall layer of a predetermined thickness is mounted;
   an elevating device for vertically moving the table;
   main rollers respectively installed at both sides of the table;
   guide rollers installed at the respective sides of the main rollers;
   at least one wire saw installed around the main rollers and the guide rollers to be parallel to the upper surface of the table; and
   a driving motor for traveling the wire saw by rotating at least one of the main rollers and the guide rollers,
      wherein the traveling wire saw cuts the partition wall layer of the substrate to a predetermined depth to form partition walls.

9. The apparatus for forming partition walls of a plasma display device as claimed in claim 8, wherein guide grooves are formed to guide the wire saws around the circumferential surfaces of the main rollers and/or the guide rollers.

10. The apparatus for forming partition walls of a plasma display device as claimed in claim 8, wherein the distance between the wire saws corresponds to the thickness of the partition wall.

11. The apparatus for forming partition walls of a plasma display device as claimed in claim 8, wherein the diameter of the wire saw corresponds to the distance between the partition walls.

* * * * *